US009223413B2

United States Patent
Pakki et al.

(10) Patent No.: US 9,223,413 B2
(45) Date of Patent: Dec. 29, 2015

(54) NEXT ACTION PAGE KEY FOR SYSTEM GENERATED MESSAGES

(71) Applicant: Honeywell International Inc., Morristown, NJ (US)

(72) Inventors: Sathish Pakki, Bangalore (IN); Sivakumar Balu, Bangalore (IN); Chandrasekhar T L V, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 276 days.

(21) Appl. No.: 13/873,909

(22) Filed: Apr. 30, 2013

(65) Prior Publication Data

US 2014/0320417 A1    Oct. 30, 2014

(51) Int. Cl.
*G06F 3/023*    (2006.01)
(52) U.S. Cl.
CPC ................... *G06F 3/0238* (2013.01)
(58) Field of Classification Search
CPC .................................................. G06F 3/0238
USPC ......................................................... 345/172
See application file for complete search history.

(56) References Cited

U.S. PATENT DOCUMENTS

| 6,828,921 | B2 | 12/2004 | Brown et al. |
| 7,979,199 | B2 | 7/2011 | Judd et al. |
| 8,229,659 | B2 | 7/2012 | Judd et al. |
| 2003/0006910 | A1* | 1/2003 | Dame .......................... 340/945 |
| 2005/0054381 | A1* | 3/2005 | Lee et al. ........................ 455/557 |
| 2005/0203676 | A1* | 9/2005 | Sandell et al. ..................... 701/3 |
| 2010/0188266 | A1 | 7/2010 | Judd et al. |
| 2012/0078447 | A1 | 3/2012 | McGuffin et al. |
| 2012/0079398 | A1 | 3/2012 | McGuffin et al. |

\* cited by examiner

*Primary Examiner* — Ariel Balaoing
(74) *Attorney, Agent, or Firm* — Fogg & Powers LLC

(57) ABSTRACT

An aerospace messaging system comprises a display unit configured to display data, a user input device configured to receive input from a user, a memory configured to store one or more key associations, and a processing unit configured to direct the display unit to display a label with a corresponding system generated message. The user input device comprises a plurality of modifiable keys. Each respective key association is an association between a respective one of the plurality of modifiable keys, a respective system generated message, and a respective action page from which a user can respond to information in the respective system generated message. The label indicates a corresponding modifiable key that is associated with a corresponding action page based on the respective key association. When the corresponding modifiable key is selected, the processing unit is configured to direct the display unit to display the corresponding action page.

15 Claims, 4 Drawing Sheets

NEXT ACTION PAGE KEY FOR SYSTEM GENERATED MESSAGES

BACKGROUND

In flying an aircraft, pilots are often required to compose and send messages either to other systems on the aircraft or to systems on the ground. For example, pilots and air traffic controllers can communicate using Controller Pilot Data Link Communications (CPDLC) messages. In addition, the avionics system on the aircraft can generate system messages for the pilot or flight crew on the aircraft. Based on generated system messages, a pilot can perform actions on the system.

SUMMARY

In one embodiment an aerospace messaging system is provided. The aerospace messaging system comprises a display unit configured to display data, a user input device configured to receive input from a user, a memory configured to store one or more key associations, and a processing unit configured to direct the display unit to display a label with a corresponding system generated message. The user input device comprises a plurality of modifiable keys. Each respective key association is an association between a respective one of the plurality of modifiable keys, a respective system generated message, and a respective action page from which a user can respond to information in the respective system generated message. The label indicates a corresponding modifiable key of the plurality of modifiable keys that is associated with a corresponding action page based on the respective key association stored in the memory. When the corresponding modifiable key is selected, the processing unit is configured to direct the display unit to display the corresponding action page.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
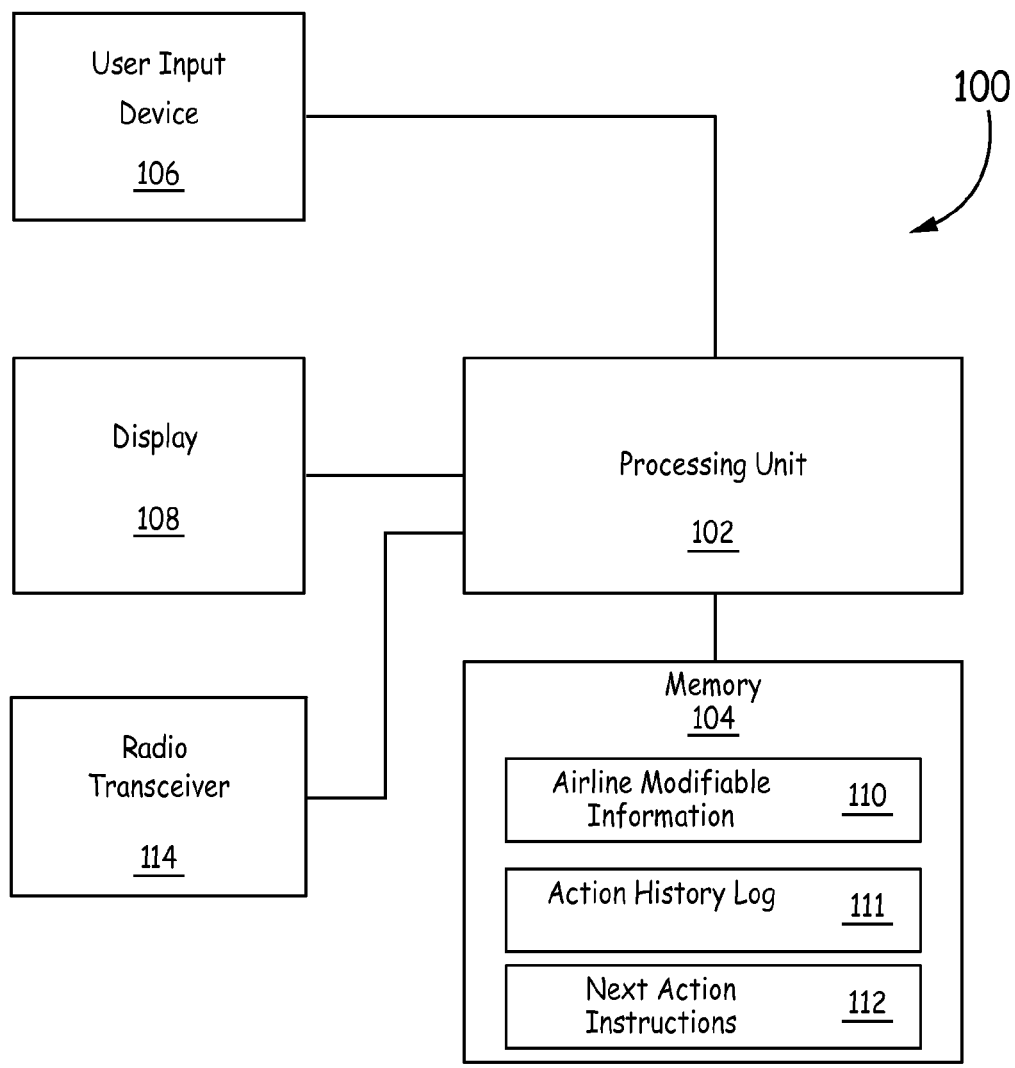
FIG. 1 is a block diagram of one embodiment of an aerospace messaging system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

The embodiments described herein reduce the burden placed on pilots or flight crew to respond to system generated messages. The term 'user' is used herein to refer to a pilot, member of a flight crew, or ground personnel such as an air traffic controller, or aircraft operator. System generated messages are also referred to as COMM System messages, scratchpad messages, advisory messages, or sidelink messages. Sidelink or system generated messages are messages that are generated by the aerospace messaging system and delivered to a user at the same general location as the aerospace messaging system. For example, a system generated message generated by the aerospace messaging system on the aircraft is delivered to the pilot or flight crew on the aircraft. Similarly, a system generated message by an aerospace messaging system on the ground is delivered to ground personnel. In addition, sidelink messages typically specify a system state. Uplink messages refer to messages generated on the ground (e.g. by the Air Traffic Control (ATC), Airline Operational Control (AOC), or Flight Information Services (FIS)) that are delivered to the pilot on the aircraft. Downlink messages are message generated on the aircraft and delivered to personnel on the ground. The embodiments described herein enable quick navigation to the desired action page corresponding to a displayed system generated message which reduces the amount of time required to navigate through the hierarchal menu structure of conventional aerospace messaging systems.

FIG. 1 is a block diagram of one embodiment of an aerospace messaging system 100. As used herein, an aerospace messaging system is a system for communicating data to or from an aircraft. The aerospace messaging system 100 includes a processing unit 102, a memory 104, a user input device 106, and a display 108. It is to be understood that each of the elements of system 100 can be implemented in a single device or in separate devices. For example, in some embodiments, the processing unit 102 and memory 104 are implemented in a Communication Management Unit (CMU) or Flight Management Computer (FMC) whereas the display 108 and user input device 106 are implemented in a Human-Machine Interface (HMI) such as a Multifunction Control and Display Unit (MCDU), Multi-input Interactive Display Unit (MIDU), or Multi-function Display (MFD) coupled to the CMU or FMC. The display 108 can be associated with a primary flight display (PFD) or an engine-indicating and crew-alerting system (EICAS) display.

In addition to displaying system generated messages, system 100 is also used for transmission of Controller Pilot Data Link Communications (CPDLC) messages to exchange communication between an Air Traffic Control (ATC) and an aircraft. In particular, the display 108 displays the uplink, downlink, and sidelink messages. The user input device 106 enables a user to navigate the menu structure, to respond to messages and/or to enter data. The processing unit 102 includes or functions with software programs, firmware or other computer readable instructions for carrying out various methods, process tasks, calculations, and control functions, used in providing aerospace message screens to a user and transmitting the user selected messages as described herein.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link. For example, in the embodiment shown in FIG. 1, next action instructions 112 are stored on memory 104 and executed by the processing unit 102. The next action instructions 112 cause the processing unit to perform the functions described herein for displaying a next action page directly from a system generated message.

Also stored on memory 104 is a key association file 110. The key association file 110 is a data file which maintains one or more key associations. A key association is an association between a respective key or button, a system generated messages, and an action page, as explained in more detail below. In this embodiment, the key association file is implemented as an Airline Modifiable Information (AMI) file 110. However, it is to be understood that in other embodiments, the key association file 110 can be implemented using other types of files, such as other data communications configuration files. As used herein, the terms 'key' and 'button' can be used interchangeably. A key can include a physical key which can be pressed or switched. In other embodiments, a key can include an icon displayed on a display which can be selected by a user, such as through a keypad, a touch on a touch screen, or 'clicking' with a mouse. In addition, as used herein, an action page refers to a page from which a user (e.g. pilot or flight crew member) can take responsive action to information in a system generated message. In conventional systems, a pilot has to navigate through various screens of the system menu in order to reach an appropriate action page from which to take responsive action based on a system generated message. However, the embodiments described herein reduce the burden by determining the appropriate action page that corresponds to the system generated message and by providing a button on the display 108 which allows direct access to the action page from which the responsive action can be taken. The displayed button is associated with the corresponding action page based on data in the key association stored in the AMI file 110. As used herein the button which takes a user directly to the action page is also referred to herein as a next action button or key.

The data in the AMI file 110 is populated prior to operation, in some embodiments. In other embodiments, the data in the AMI file 110 is populated during operation. For example, in some embodiments, the next action instructions 112 cause the processing unit 102 to analyze an action history log 111 to obtain the data for populating the AMI file 110. In particular, in such embodiments, the action history log 111 maintains a log of which action pages are accessed or navigated to by a user in response to a system generated message. Based on the action page accessed by the user, as stored in the action history log 111, the processing unit 102 inserts an association between the system generated message and the corresponding action page into the AMI file 110. When the system generated message is displayed subsequently, the next action instructions 112 cause the processing unit 102 to retrieve the association from the AMI file 110 and configure a respective button which, when selected, causes the corresponding action page to be displayed without having to navigate through the structural hierarchy of the system menu as in conventional systems. In addition, the processing unit 102 directs the display unit to display a label indicating which button has been configured for the next action page.

The processing unit 102 can be configured to select either the most recently used action page from the action history log 111 or to select the most frequently used action page based on analysis of the action history log 111. In addition, in some embodiments, a default action page can be associated with each system generated message prior to operation and can be modified or updated during operation based on entries in the action history log 111. It should also be noted that, although next action instructions 112, AMI file 110, and action history log 111 are depicted in FIG. 1 as being stored on the same memory 104, each can be stored on a separate memory device in other embodiments.

In addition, in some embodiments, the key association file 110 is not included. For example, in some such embodiments, the processing unit 102 creates a key association and directs the display unit to display the label, as described above, based directly on information from the action history log 111. Thus, it is not always required that information from the action history log 111 be inserted into the key association file 110. In some other embodiments, default key associations are hard-coded in the messaging system. Hence, in such embodiments, the key association file 110 and the action history log 111 can be omitted, and the default key association is not updated during operation. Additionally, in some embodiments, the action history log 111 is not included and the key association file 110 is implemented using a different type of file. For example, in one such embodiment, a default action page is associated with each system generated message and the key association file 110 is implemented using a Static Key Association Memory File. The processing unit 102 uses the default action key association stored in the Static Key Association Memory File. The Static Key Association Memory File can be stored on memory 104 or on a separate memory device. The AMI file and Static Key Association Memory File are different types of files. The AMI file is provided/updated by the Airlines, for example, whereas the Static Key Association Memory File is fixed/static along with the system itself.

Figure 2:
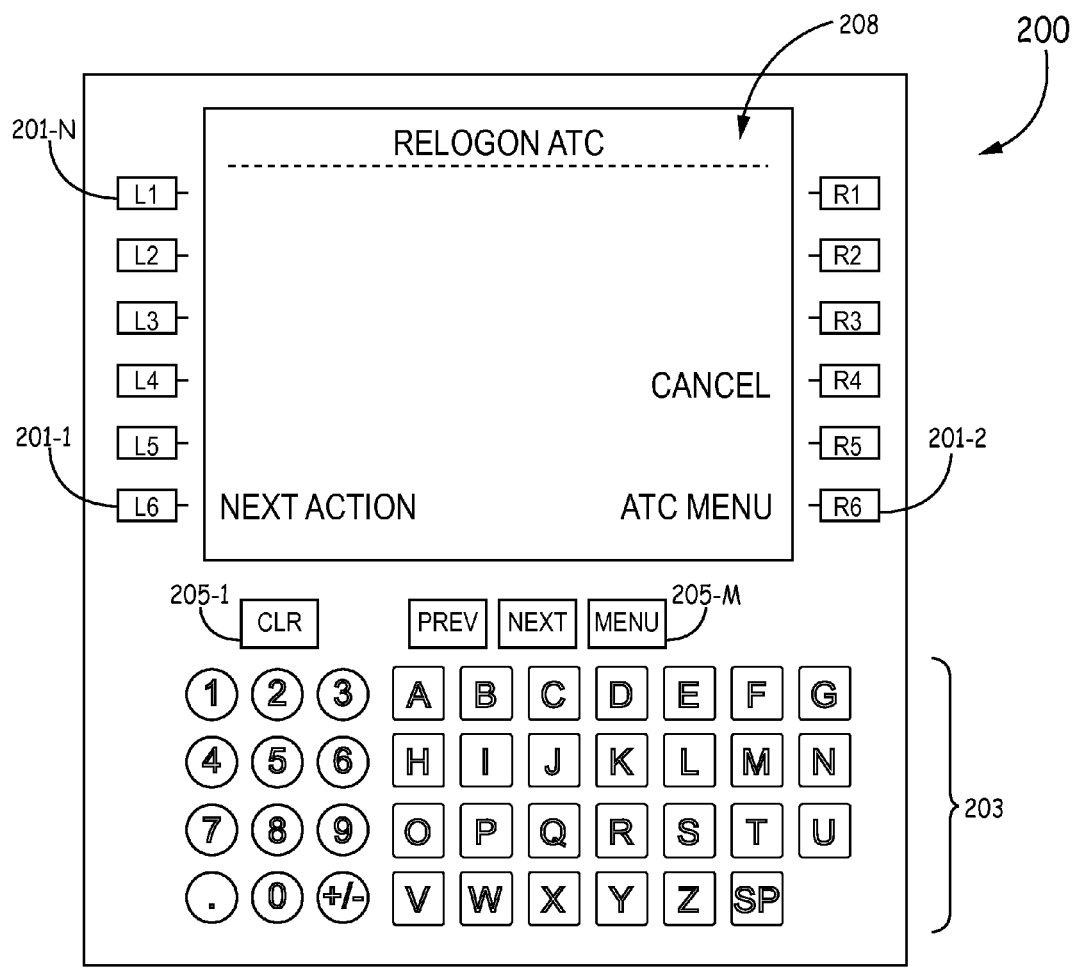
FIG. 2 is a block diagram of one embodiment of a human machine interface.
Figure 3:
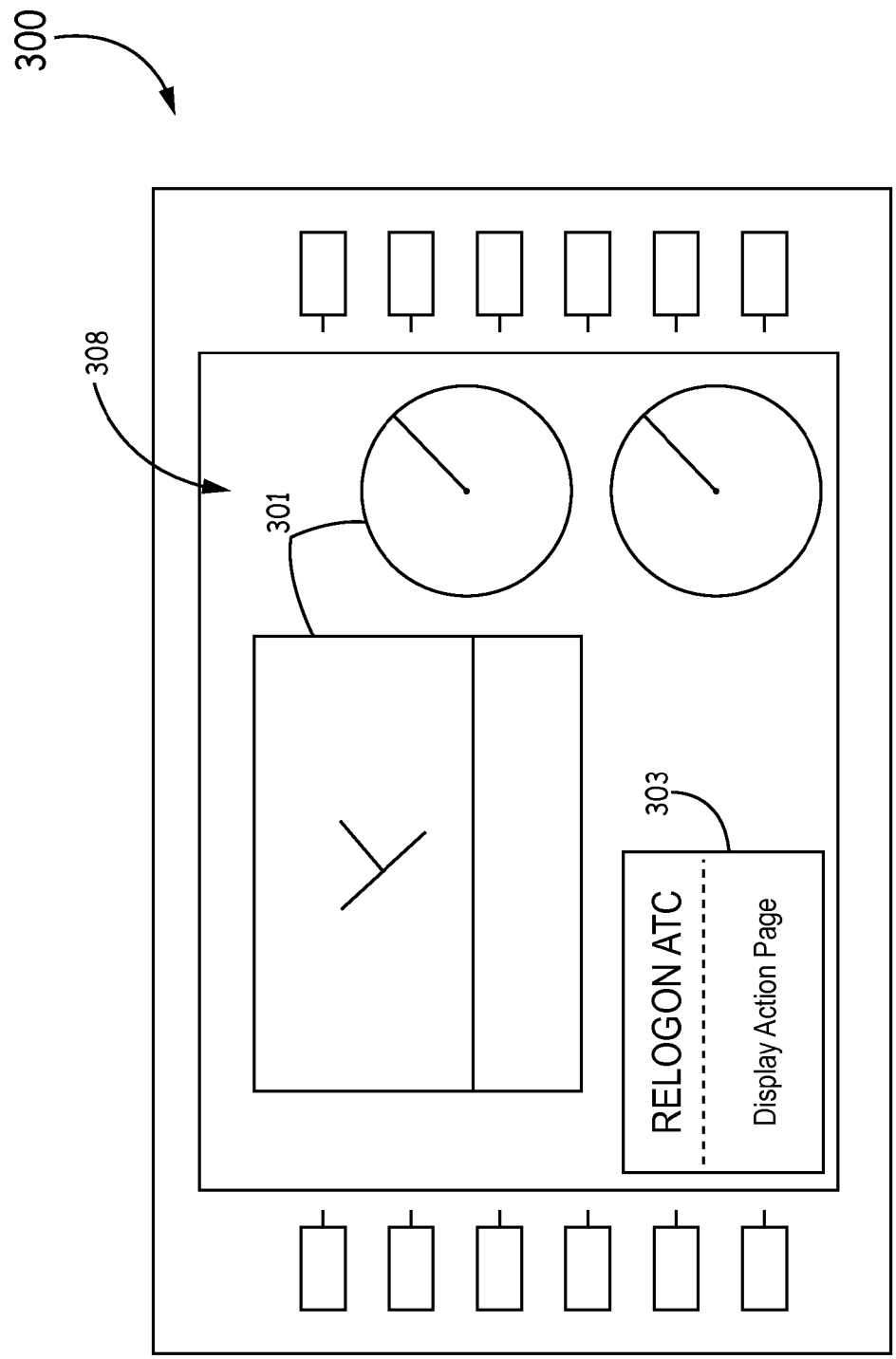
FIG. 3 is a block diagram of another embodiment of a human machine interface.

FIG. 2 depicts an exemplary communication device 200 configured to display a next action button. The communication device 200 includes user input elements. In particular, the user input elements include pre-defined function buttons 205-1 . . . 205-M, modifiable or custom buttons 201-1 . . . 201-N, and alpha-numeric keypad 203. In addition, the communication device 200 includes textual-based display 208. That is, the display 208 is configured to display text only. However, it is to be understood that, in other embodiments, a display capable of displaying both graphics and text is used, such as in the example shown in FIG. 3. In particular, the example shown in FIG. 3 includes graphics 301 which depict flight information, such as speed, altitude, etc. The display 308 also includes an area 303 for displaying messages such as sidelink messages. For example, the area 303 for messages can be a dedicated text box on the display, in some embodiments, or a "pop-up" window which is overlaid on other graphics when displayed, in other embodiments.

In addition, in some embodiments, the display 208 uses touch-screen technology for user input, as known to one of skill in the art. In some such embodiments, the pre-defined buttons 205-1 . . . 205-M, action buttons 201-1 . . . 201-N, and/or alpha-numeric keypad 203 are implemented as buttons or icons on the touch-screen technology rather than as physical buttons separate from the display 208.

The pre-defined function buttons 205-1 . . . 205-M are buttons which are permanently associated with a particular functionality, such as moving to the next or previous page, displaying a menu, etc. The custom buttons 201-1 . . . 201-N, also labeled as L1 . . . L6 and R1 . . . R6 in FIG. 2 for purposes of explanation, are buttons which are associated with different functions depending on the message or information displayed on the display 208. For example, in the embodiment shown in FIG. 2, the display 208 presents the system generated message "RELOGON ATC." It is to be noted that the system generated message has been simplified for purposes of explanation. That is, additional data may be displayed accompanying the RELOGON ATC message in operation. Other custom buttons may also be displayed on the RELOGON ATC sidelink message in operation. Thus, the example shown in FIG. 2 is presented by way of example only for purposes of explanation.

In the example shown in FIG. 2, custom buttons L6, R4, and R6 each have an associated function for the system generated message "RELOGON ATC." In particular, custom button R4 is associated with a cancel function which closes the message. Custom button R6 is associated with a function which causes the display 208 to display the ATC menu. The display 208 displays a label associated with each custom button indicating which custom button is associated with the function described by the label. For example, for custom button L6, the display 208 displays the label "Next Action." Thus, the label indicates that selection of custom button L6 causes the display 208 to display the next action page associated with the "RELOGON ATC" message in a key association file, as discussed above. Thus, the page to which the "Next Action" button directs the user is dependent on the system generated message being displayed and on the key associations, such as those set forth in the key association file, for example.

In addition, in some embodiments, a sidelink or scratchpad message can be displayed in a section of the display 208 while another screen/page is currently being displayed on the display 208. For example, if display 208 is displaying a downlink page when a scratchpad message is generated based on system state, the sidelink message can be displayed in a portion of the display 208, such as a portion of the display 208 below the custom buttons L6 and R6. In addition, the processing unit identifies if there is a custom button 201 that is not associated with any functionality (e.g. a free key) on the currently displayed screen/page. If there is a custom button 201 available, the available custom button 201 is associated with the next action key page according to the key associations and a label, such as "Next Action Key" is displayed, as discussed above.

Thus, the page that was being displayed, when the sidelink message was generated, is not replaced by the sidelink message in such embodiments. Rather, the page is updated with the sidelink message and next action key labels.

In addition, it is to be understood that other labels can be displayed for the next action button. For example, in other embodiments, other labels such as "Display action page" are used. In addition, in some embodiments, the name of the action page associated with the next action button is displayed as the label. The label can indicate a physical button or an icon which can be selected on the display 208. The label can include text and/or graphics. Furthermore, it is to be understood that the next action button (also referred to herein as "next action page button") for each system generated message does not need to be associated with the same custom button 201. In addition, in some embodiments, a system generated message can be associated with two or more action pages. In such embodiments, two or more next action buttons can be configured for respective action pages and displayed on the screen with the system generated message.

After selection of one of the custom buttons having a defined function (e.g. L6, R4, R6 in this example), each of the custom buttons 201 may be associated with a different function for the resultant screen or page which is displayed. As used herein, the terms 'screen' and 'page' can be used interchangeably.

Table 1 below lists exemplary system generated messages and some exemplary action pages which can be associated with the system generated messages via the next action button discussed above.

TABLE 1

| System Generated Message | Next Action Page |
| --- | --- |
| 1. ATC Datalink Lost | 1. ATC Logon page |
| | 2. SYS INFO PAGE/Manager Page |
| 2. Re-Logon to ATC COMM | 1. ATC Logon page |
| | 2. SYS INFO PAGE/Manager Page |
| 3. ATC COMM Established | ATC MENU page |
| 4. Invalid ATC uplink | 1. Corresponding downlink message pre-populated with the prior data |
| | 2. A page enabling the pilot to take action to correct reason why invalid |
| 5. Armed Report | 1. Corresponding Report downlink page |
| | 2. Original Uplink message |
| | 3. Report pending list |
| 6. Conditional Clearance | 1. downlink page of the parameter not met |
| | 2. ATC Uplink original message |

As shown in Table 1, for some system generated messages, more than one option is available for the next action page, such as the Armed Report system generated message. In addition, in some instances, the same action pages are associated with more than one system generated messages, such as the action page options for the ATC Datalink lost and Re-logon to ATC COMM system generated messages.

Each sidelink message is generated to inform the pilot of certain events and allow the pilot or flight crew to take action as necessary. For example, the ATC Datalink lost sidelink message is generated when an established connection over a communication link between the air traffic control and the aircraft is lost. Based on the options in Table 1, the next action page key is associated with the ATC logon page if a communication link, such as an Aeronautical Telecommunication Network (ATN) or an Aircraft Communications Addressing and Reporting System (ACARS) link, is available. The flight crew is able to re-establish a connection over the available communication link via the ATC logon page. The processing unit 102 can determine if a communication link is available via data received from the radio transceiver 114, as understood by one of skill in the art. If a communication link is not available, the processing unit 102 associates the next action page key with a system information (SYS INFO) or manager page from which the flight crew can start a test to locate a communication link or view the status of available link(s).

The Re-logon to ATC COMM sidelink message is similar to the ATC Datalink lost sidelink message. However, the Re-logon to ATC COMM message is generated after an unsuccessful attempt to establish a connection with the air traffic control. Thus, if a communication link is available, the next action page is associated with the ATC logon page so that the flight crew can attempt to establish a connection again. If a communication link is not available, the next action page is associated with the SYS INFO or manager page.

The ATC COMM Established sidelink message is generated to indicate a successful attempt to establish a connection with the air traffic control. In this example, the next action page is associated with the ATC menu to initiate new CPDLC downlink messages.

The Invalid ATC uplink sidelink message is generated when a received ATC uplink message contains format or other errors. If the ATC uplink message is in response to a previously transmitted downlink message, the processing unit 102 can configured the next action page key displayed on the Invalid ATC uplink sidelink message to be associated with a page displaying the corresponding downlink message pre-populated with the prior data. The corresponding downlink message can be identified by the message reference number (MRN) of the uplink message. In particular, each uplink/downlink message includes a message identification number (MIN) in the header of the message. If the message is generated responsive to a previously received message, then that newly generated message includes a MRN that has the same value as the MIN of the associated received message.

Alternatively, the next action page key on the Invalid ATC uplink sidelink message page can be associated with a page displaying the reason why the ATC uplink message is invalid. Similarly, if the pilot can take corrective action, the next action page key on the Invalid ATC uplink page can be associated with a page enabling the pilot to take the corrective action.

As understood by one of skill in the art, an armed report is a report that is configured to be transmitted automatically when specific conditions are met. Thus, the Armed Report sidelink message is generated to indicate that an armed report has been transmitted. The next action page button on the Armed Report sidelink message can be configured to direct the user to the corresponding report downlink page which shows the information transmitted in the report. Alternatively, the next action page button can be configured to display the original uplink message which triggered sending the report. In another alternative, the next action page button can be associated with a report pending list which display reports that are still pending.

The Conditional Clearance sidelink message is generated when clearance for a requested action (e.g. met position, level, speed, etc.) is given conditional clearance. If the condition is not met, the next action page button can be associated with a downlink page displaying the parameter which has not been met so that the pilot can send a request to the ATC for a new value of the parameter to be met. If the condition has been met, the next action page button can be associated with a page displaying the original ATC uplink message which specified the condition so that the pilot can review the uplink message.

It is to be understood that the sidelink messages discussed above are presented by way of example and not by way of limitations. In particular, a next action page button can be configured for other sidelink messages in addition to or in lieu of those discussed above. Some examples of other possible sidelink messages include, but are not limited to, Respond to ATC uplink, Automatic Dependent Surveillance (ADS) Established, and ADS Terminated. In addition, it is to be understood the next action page button for each of the above sidelink messages can be configured to direct the user to a screen or page different from those discussed above. In particular, those discussed above are presented by way of example only.

Figure 4:
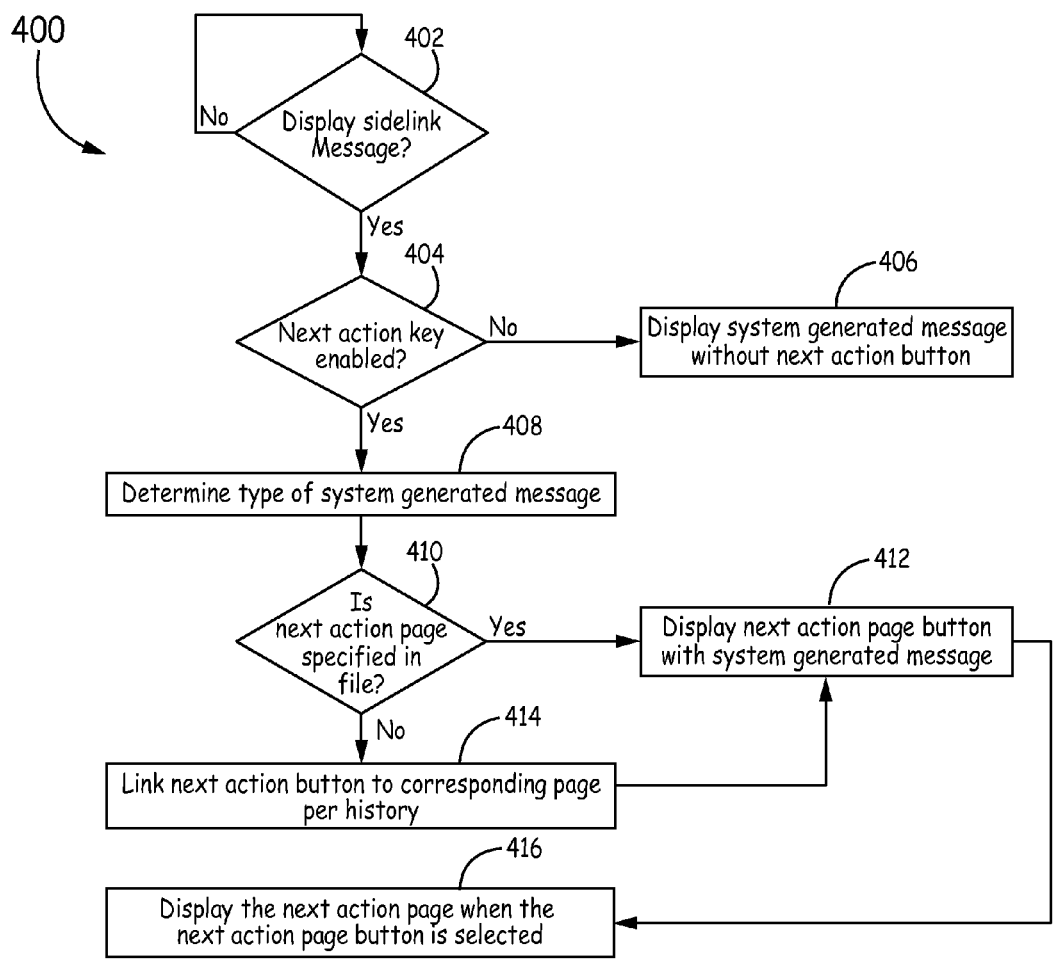
FIG. 4 is a flow chart of one embodiment of a method of displaying a next action key.

FIG. 4 is a flow chart of one embodiment of a method 400 of displaying a next action key. Use of the next action key can reduce workload on a flight crew. At block 402, it is determined if a sidelink or system generate message is to be displayed. For example, certain conditions or events are associated with a respective sidelink message, as understood by one of skill in the art. Hence, occurrence of the condition or event results in the display of an associated sidelink message. At block 404, it is optionally determined if the next action page button feature is enabled. In other words, it is determined if the use of an action page button on the system generated message screen is enabled. For example, the key association file discussed above can be configured to enable/disable the display of the next action page key via an entry in the key association file. Additionally, in some embodiments in which a log of past pages/actions is used to determine the next action page, the feature is not enabled if no history is yet available, such as at start-up. If the next action page button feature is not enabled, a system generated message is displayed without the next action page button at block 406. If the next action page button feature is enabled, it is determined at block 408 what type of system generated message is to be displayed.

At block 410, it is determined if a next action page has been specified for the system generated message. For example, it can be determined if the key association file has been configured with a next action page. As discussed above, the specified page can be set a priori or it can be set dynamically based on a log or history of user selections. In addition, in some embodiments, a default page can be set a priori.

If a next action page has been specified for the given system generated message, the system generated message is displayed together with a label for the next action page button at block 412. In other words, as discussed above, a customizable button is configured with the functionality to display the next action page specified when selected. The label on the display indicates which button to press or otherwise select. In addition, the label can state "Next Action," "Display Next Action Page," or the name of the next action page, etc.

If a next action page has not been specified in the key association file for the given system generated message, then an association is created between one of the customizable buttons and an action page for the given system generated message at block 414, as discussed above. For example, an analysis of a history log can be used to create or update an association. The system generated message is then displayed together with a label for the next action page button at block 412. At block 416, the next action page associated with the next action page button is displayed when the next action page button is selected. In this way, the user is taken directly to the next action page without having to traverse the menu structure.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An aerospace messaging system comprising:
a display unit configured to display data;
a user input device configured to receive input from a user, the user input device comprising a plurality of modifiable keys, wherein a modifiable key is a key that has a modifiable function;
a memory configured to store one or more key associations, wherein each respective key association is an association between a respective one of the plurality of modifiable keys, a respective system generated message, and a respective action page from which a user can respond to information in the respective system generated message, wherein the memory is further configured to store a history of user selected pages; and
a processing unit configured to direct the display unit to display a label with a corresponding system generated message, the label indicating a corresponding modifiable key of the plurality of modifiable keys that is associated with a corresponding action page based on the respective key association stored in the memory;
wherein the processing unit is configured to determine the respective modifiable key, the respective system generated message, and the respective action page for at least one key association based on the history of user selected pages;
wherein the at least one key association is configured with a respective default modifiable key, respective default system generated message, and respective default action page;
wherein the processing unit is configured to update the respective default action page based on the history of user selected pages;
wherein, when the corresponding modifiable key is selected, the processing unit is configured to direct the display unit to display the corresponding action page.

2. The aerospace messaging system of claim 1, wherein each respective system generated message comprises one of an Air Traffic Control (ATC) datalink lost message, a Re-Logon to ATC COMM message, an ATC COMM Established message, an Invalid ATC uplink message, an Armed Report message, or a Conditional Clearance message.

3. The aerospace messaging system of claim 1, wherein the plurality of modifiable keys each comprise one of a physical button or an icon on a display.

4. The aerospace messaging system of claim 1, wherein the at least one key association comprises at least one default key association configured with a respective default modifiable key, respective default system generated message, and respective default action page;
wherein the at least one default key association is stored in a static key association memory file.

5. The aerospace messaging system of claim 1, wherein a single action page is included in two or more respective key associations to associate the single action page with two or more respective system generated messages.

6. The aerospace messaging system of claim 1, wherein one of the one or more key associations includes a single respective system generated message, two or more respective modifiable keys, and two or more respective action pages.

7. The aerospace messaging system of claim 1, wherein the display unit comprises one of a primary flight display (PFD), or an engine-indicating and crew-alerting system (EICAS) display.

8. A method comprising:
determining if use of an action page key with a system generated message is enabled;
if use of the action page key is enabled:
determining what type of system generated message is to be displayed;
determining if an action page has been specified for the determined type of system generated message;
if an action page has been specified, displaying a label for an action page key together with the system generated message on a display unit; and
displaying the action page specified for the determined type of system generated message when the action page key is selected;
if use of the action page key is not enabled:
displaying the system generated message without a label for an action page key.

9. The method of claim 8, wherein displaying the label comprises displaying one of a label for an icon on the display unit, or a label indicating a physical button associated with the display unit.

10. The method of claim 8, wherein the method further comprises:
if an action page has not been specified, associating an action page with the determined type of system generated message based on a history of user selected pages.

11. The method of claim 10, wherein associating an action page with the determined type of system generated message comprises associating an action page with the determined type of system generated message based on the action page most frequently selected by a user in response to the determined type of system generated message.

12. The method of claim 10, wherein associating an action page with the determined type of system generated message comprises associating an action page with the determined type of system generated message based on the action page most recently selected by a user in response to the determined type of system generated message.

13. A program product comprising a non-transitory processor-readable medium on which program instructions are embodied, wherein the program instructions are configured, when executed by at least one programmable processor, to cause the at least one programmable processor to:
determine when to display a respective system generated message;
retrieve a key association from a memory, the key association corresponding to the respective system generated message, wherein the key association is an association between a respective modifiable key, the respective system generated message, and a respective action page from which a user can respond to information in the respective system generated message;
direct a display unit to display the respective system generated message and a label together, the label indicating the respective modifiable key that is associated with the respective action page based on the key association retrieved from the memory;
update the respective action page in the key association based on a history of user selected pages, including:
the action page most frequently selected by a user in response to the respective system generated message; or the action page most recently selected by a user in response to the respective system generated message; and direct the display unit to display the respective action page when input is received indicating that the respective modifiable key was selected by a user.

14. The program product of claim 13, wherein the program instructions are further configured to cause the at least one programmable processor to:

direct the display unit to display one of a label for an icon on the display unit, or a label indicating a physical button associated with the display unit.

15. The program product of claim 13, wherein the program instructions are further configured to cause the at least one programmable processor to direct a display unit to display the respective system generated message and the label indicating the respective modifiable key on a page being displayed when the respective system generated message was generated.

* * * * *